United States Patent [19]

Levine

[11] Patent Number: 4,847,825
[45] Date of Patent: Jul. 11, 1989

[54] METHOD AND APPARATUS FOR SIGNALING THE VOLUME LEVEL OF REPRODUCING APPARATUS FOR DIGITALLY RECORDED SOUND

[76] Inventor: Michael R. Levine, 2900 Heatherway, Ann Arbor, Mich. 48104

[21] Appl. No.: 84,978
[22] Filed: Aug. 10, 1987
[51] Int. Cl.[4] .............................................. G11B 7/00
[52] U.S. Cl. ......................................... 369/47; 369/50
[58] Field of Search ...................... 369/53, 50, 51, 48, 369/49

[56] References Cited

U.S. PATENT DOCUMENTS

| | | | |
|---|---|---|---|
| 3,051,795 | 8/1962 | Roberts et al. | 369/53 |
| 3,171,902 | 3/1965 | Jones et al. | 369/50 |
| 3,881,072 | 4/1975 | Becker | 369/50 |
| 3,958,272 | 8/1976 | Rotter et al. | 369/50 |
| 4,519,057 | 5/1985 | Higashihara et al. | 369/50 |
| 4,764,860 | 8/1988 | Takao | 369/50 |

Primary Examiner—William L. Sikes
Assistant Examiner—Akm E. Ullah
Attorney, Agent, or Firm—Krass & Young

[57] ABSTRACT

In order to warn persons who are about to listen to sound performances from player apparatus using digital records and particularly those listeners using headphones, of the volume setting of the record player, a warning sound having an amplitude substantially lower than the amplitude of the recorded performance, and proportional to the volume setting of the player, is generated for a few seconds before the player begins to reproduce the performance. The warning signal may emanate from digital signals encoded on the record media before each recorded performance, or alternatively, may be generated by circuitry built into the player that generates its own warning tone for a few seconds following the actuation of the "play" button.

17 Claims, 3 Drawing Sheets

METHOD AND APPARATUS FOR SIGNALING THE VOLUME LEVEL OF REPRODUCING APPARATUS FOR DIGITALLY RECORDED SOUND

BACKGROUND OF THE INVENTION

1. Field of the Invention

This invention relates to digital records of audio performances and to player apparatus for reproducing the sound performances from the records, and to a method and apparatus for generating audio warning signals prior to the start of reproduction of each performance.

2. Prior Art

If the volume control of a phonograph is set too high before the reproduction of the recorded musical performance begins, the listener may be subjected to an uncomfortably high level of sound when the performance starts. If earphones are used, these sounds can damage the listeners eardrums. When a conventional phonograph record is played, the background noise generated by the record at the leading edge, prior to the start of the performance, generates a warning signal to the listener so that an excessively high setting of the volume control can be detected before the performance starts and the volume control can be lowered to a more appropriate level.

This background noise level produces a hiss on reproduction throughout the performance. Removal of this background noise level is one of the advantages provided by systems which record the sound performance in digital form, usually on record media consisting of laser readable disks or magnetic tape, and employ a digital player to reproduce the performance stored on the record media. The absence of random background noise during the reproduction of the performance is an unalloyed benefit, substantially improving the quality of the reproduction, and the silence due to the absence of background hiss before the reproduction of the first recorded sound performance on the media and between sequential performances on the same record, conveys to the listener an impression of the high quality of the reproduction process.

But that very silence creates a problem with prior art digital record players for those recordings, in that the listener receives no audible signal as to the setting of the volume control of the player, and if the volume control is set too high, the actual musical performance may begin with an unpleasant or even dangerous blast of sound. The danger is particularly acute if the listener is using earphones and can result in temporary or even permanent loss of hearing.

SUMMARY OF THE INVENTION

The present invention is accordingly directed toward a method of generating warning tones prior to the playback of digital recordings with the warning sounds having a substantially lower amplitude than the sound performance to be reproduced. The volume of the warning sound provides the listener with an audible indication of the setting of the volume control for the player without itself constituting a dangerously loud sound. The method of the present invention may be practiced by either digitally recording low amplitude warning signals on digital recordings before the encoding for each performance so that when the sound is reproduced using a conventional record player a warning signal is generated which is lower in amplitude than the ensuing performance, and has an amplitude that is a function of the volume control setting; or, alternatively, providing a record player that may be used with conventional digital records but contains circuitry for generating the desired warning sound for a few seconds before commencing reproduction of the sound signals recorded on the record. This latter arrangement has the advantage of generating the warning signal even if the player is controlled to begin reproduction in the middle of a recorded soundtrack. This arrangement has the further advantage in that it may include circuitry which allows the listener to disable the warning signal.

With either embodiment of the apparatus for practicing the invention, a warning sound may be generated in such a way as to produce a short period of silence before the warning tone to convey to the listener the purity of the reproduction process.

The warning sound may take the sound of a tone, either continuous or interrupted, or a particular musical sound such as bells, trumpets or the like. The period of the warning sound should be sufficient to allow the listener to adjust the volume control before the start of the ensuing performance, and may be in the range of 2-10 seconds.

BRIEF DESCRIPTION OF THE DRAWINGS

Other objectives, advantages, and applications of the present invention will be made apparent by the following detailed description of several preferred embodiments of the invention.

The description makes reference to the accompanying drawings in which.

DETAILED DESCRIPTION OF THE PREFERRED EMBODIMENTS

Figure 1:
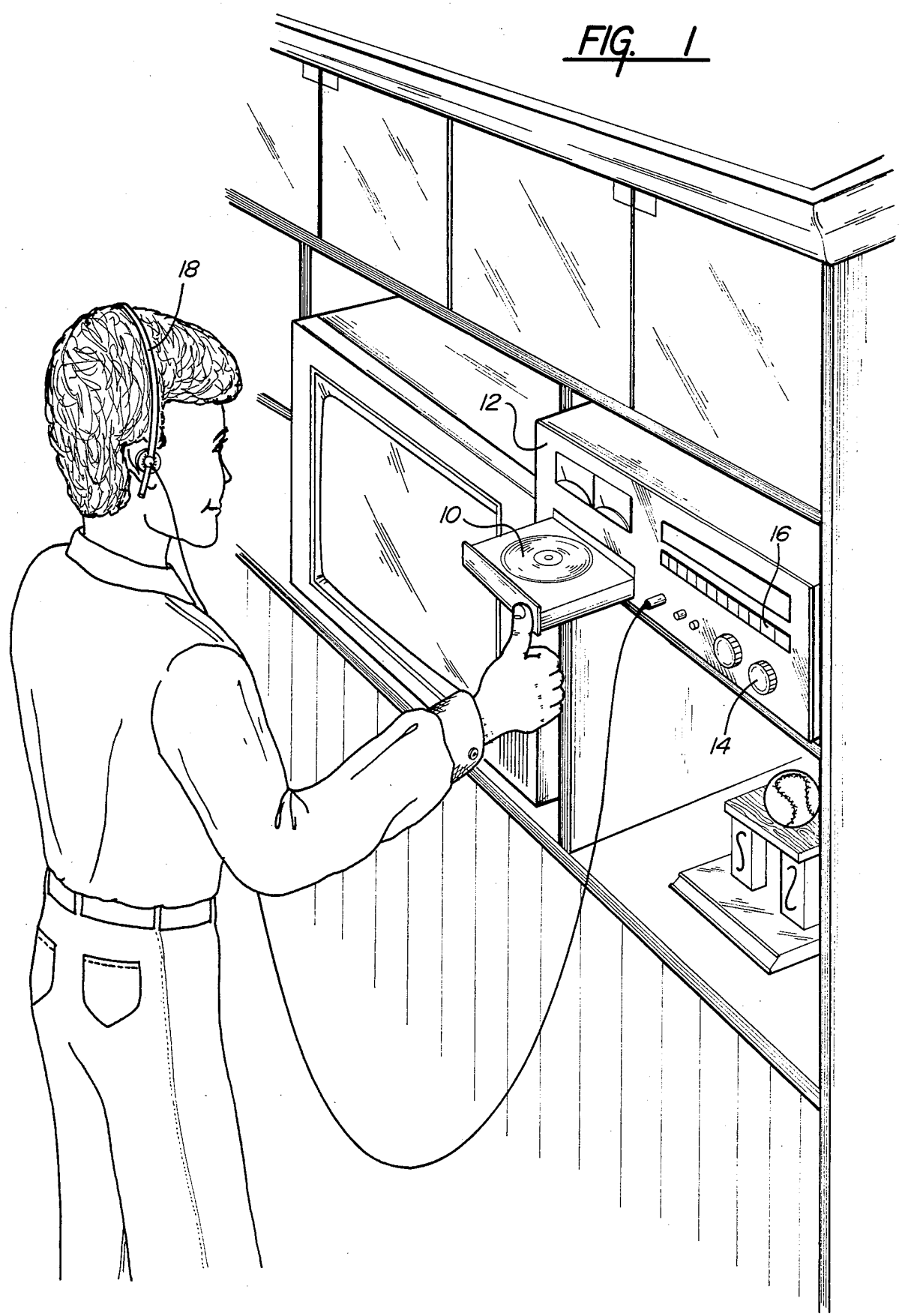
FIG. 1 is a perspective view of a digital recording on a disk and a player for the recording of the type useful with the present invention.

The present invention is useful with digital records in the form of laser-readable codings on disks 10 which may be reproduced by record players 12. The controls for the record player typically include a manually adjustable volume controls 14 and a "play" button 16 which are to be manually actuated to initiate playback operation. These controls are often incorporated in a remote controlled handset (not shown) which communicates with the player 12 by infrared signals or the like. The sound output of the player may be reproduced over loudspeakers (not shown) but the advantages of the present invention are most critical when the listener uses earphones 18.

The present invention is equally applicable to digital signals encoded on other media such as tape or the like. The sound performance recorded on the media are typically music and a single record typically incorporates a number of musical selections which may be sequentially or randomly accessed. When the performances are reproduced sequentially, there is typically a time delay of 2-10 seconds between the playback of sequential performances.

Figure 2:
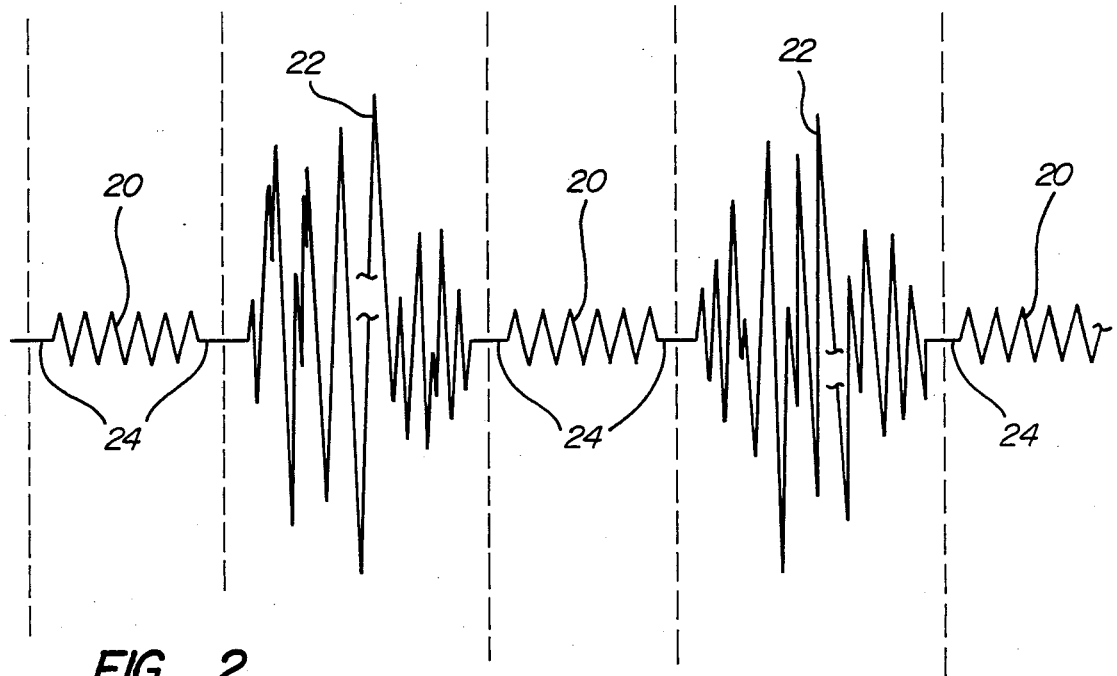
FIG. 2 is a plot of the amplitude of sound signals produced by a digital record containing a number of musical performance, each preceded by a warning sound generated by digital coding on the record media.

One form of use of the invention simply consists of recording digital signals on the record media 10, preceding each musical performance. These record media may thus be used with a conventional, unaltered record player. FIG. 2 constitutes a plot of the intensity of the sounds reproduced from a digital record formed in accordance with the present invention illustrating periods of warning tones 20 followed by musical performances 22. In the interval between a pair of musical performances 20, the period in which the warning sound 20 is generated is preferably only a portion of the time interval between playback of the two performances, so that silence is generated for a period indicated at 24.

The warning sounds, which may be tones or music, continuous or interrupted, preferably have a maximum value substantially lower than the maximum amplitude of the sounds reproduced during the performance of the sections 20. Preferably, the maximum amplitude of the warning signal is about 10-30 db lower than the maximum amplitude of the performance. Accordingly, even if the volume control is set too high for comfort, the listener will not be disturbed by the warning sound, but will be alerted to adjust the volume control level before the playback of the recorded performance 20 occurs.

Figure 3:
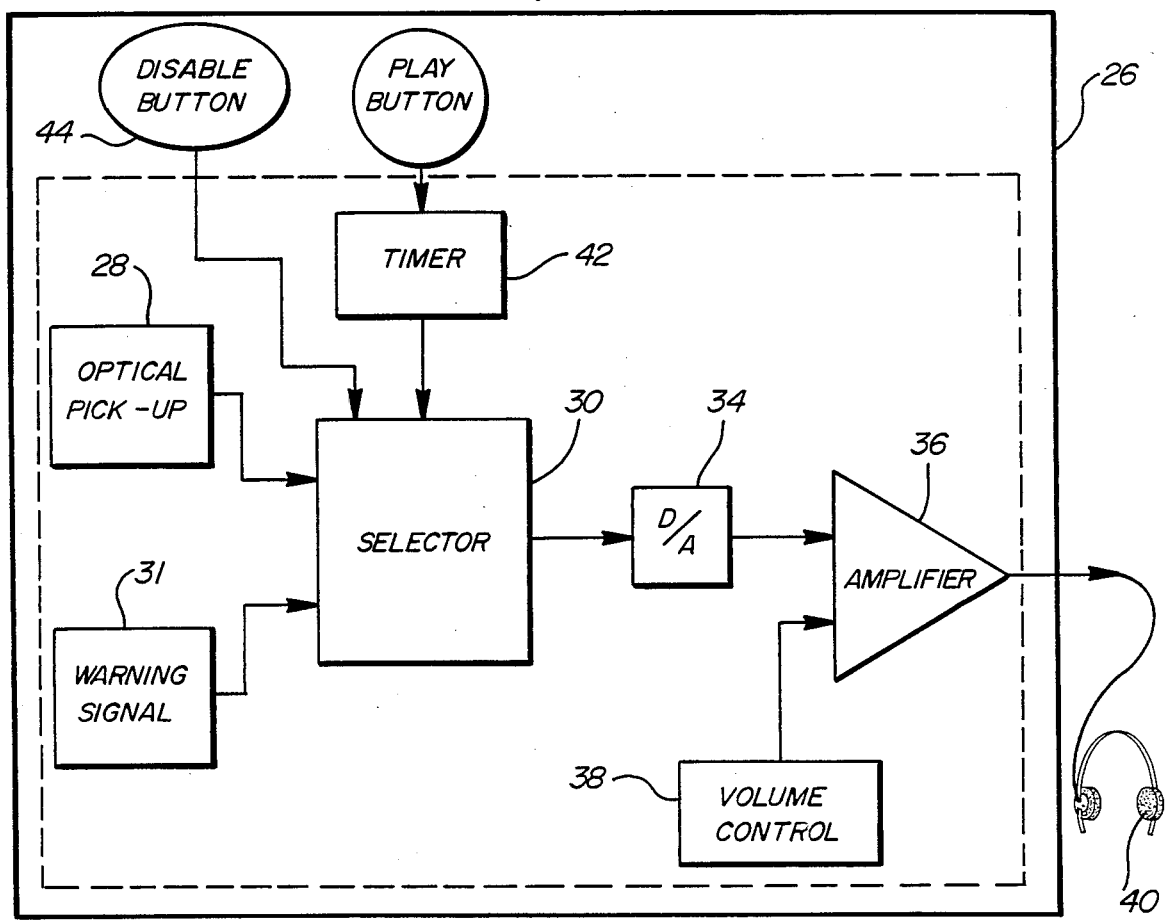
FIG. 3 is a schematic diagram of the circuitry of a digital record player incorporating means for generating the warning sounds of the present invention when used with conventional records.

The record player schematically illustrated in FIG. 3 represents an alternative form of the invention which may be used with conventional digital records without special warning sound recordings and yet will produce the warning sound before the record player begins to reproduce the performance. The record player, generally indicated at 26, includes a pickup section 28 which may be an optical, using a laser, or other form. The output of the pickup 28 is provided to a two position switch 30. The other input to the switch comes from a digital signal source 32 within the player. This may constitute a read-only memory, constant member generator, or the like.

The output of the switch 30 is provided to a digital to analog converter 34 which in turn feeds an amplifier 36. The output of the amplifier, controlled by a volume control 38, is provided to the sound reproduction apparatus such as headphones or speakers 40.

Figure 4:
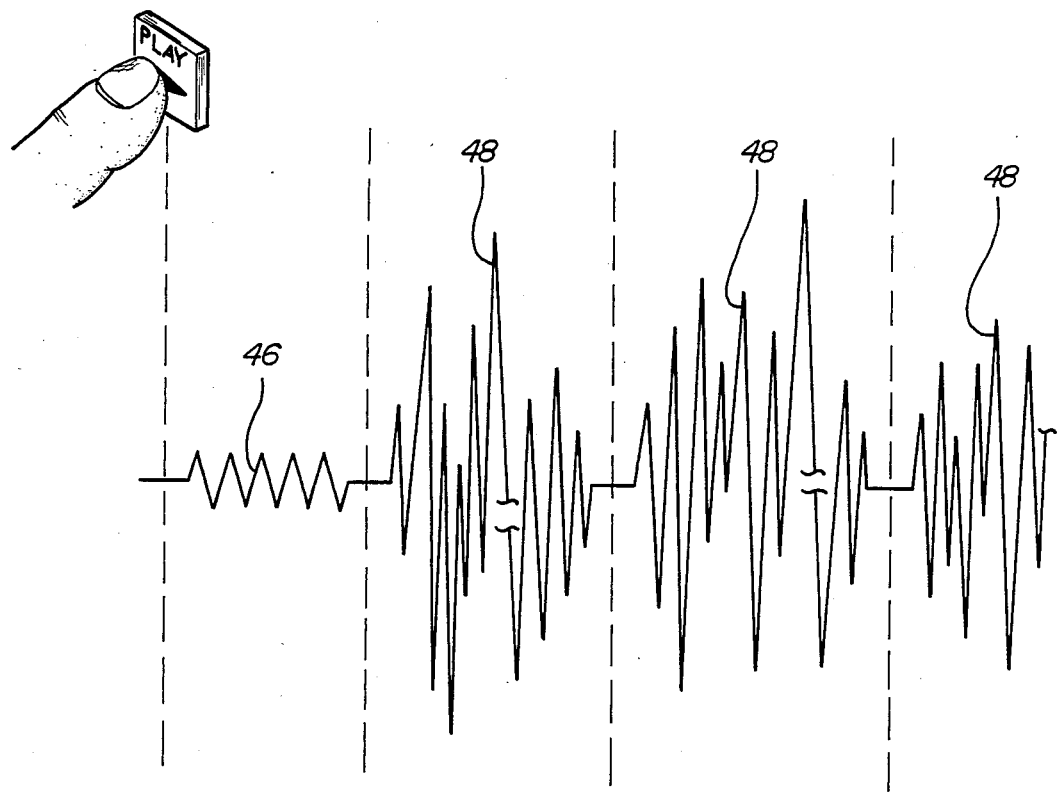
FIG. 4 is a plot of the amplitude of sound signals produced by the player of FIG. 3.

The position of the switch 30 is controlled by a time delay generator 42. The manually actuated "play" button 16 which is actuated when the operator desires the performance to begin provides its output to the time delay circuit 42 which controls the switch 30 to provide signals from the warning tone generator 32 to the digital analog converter 34 and the amplifier 36. This results in generation of the warning sound plotted at 46 in FIG. 4. After the time delay, which may typically be 2 to 10 seconds in length, has terminated, the switch 30 turns to the pickup 28 and the performance recorded on the record media used with the system is reproduced, as indicated at 48 in FIG. 4. This embodiment may also include a manually actuated disable switch 44 which when actuated by the user disables the warning signal.

With this embodiment of the invention, the warning sound is generated even if the play of the record is initiated in the middle of a performance. If several performances are performed sequentially, without interruption, no warning sound is generated between the performances, but the warning sound generated at the initiation of the playback will suffice to allow proper adjustment of the volume control by the operator.

Having thus described my invention, I claim:

1. The method of signaling to the listener of a sound performance encoded on a digital record or tape as to the volume setting of the player apparatus for the record comprising generating an audible warning signal having a maximum amplitude lower than the maximum amplitude of reproduction of said performance for a predetermined period of time terminating prior to the beginning of reproduction of said performance by said player apparatus.

2. The method of claim 1 wherein said warning signal terminates immediately prior to the beginning of reproduction of said performance by said player apparatus.

3. The method of claim 1 wherein said player apparatus includes an adjustable volume control and the amplitude of both said warning signal and the reproduced recorded performance is controlled by said volume control.

4. The method of claim 3 wherein said warning signal is generated by encoding said record with a digital signal operative to cause said player apparatus to generate said warning signal.

5. The method of claim 4 wherein said digital record contains a plurality of separate segments, each encoding a separate audio performance and said warning signals are digitally encoded on said record at such points as to produce warning signals prior to reproduction of each recorded performance by the player.

6. The method of claim 5 wherein during reproduction of said performances encoded on said record by said player apparatus, a time delay occurs between the reproduction of successive performances and wherein said warning tone occupies only a portion of said interval whereby no sound is produced by said player apparatus during the balance of said interval.

7. The method of claim 1 wherein said player apparatus includes switch means for initiating the reproduction of sounds encoded as digital signals on said record and further including means contained within the player apparatus for generating said warning signals for a predetermined period of time following the actuation of said switch and for causing reproduction of performances represented by digital signals encoded on said record following said predetermined time interval.

8. The method of claim 7 wherein said warning signal is generated by said player apparatus utilizing digital signals encoding said warning signal as a source.

9. The method of claim 8 wherein said warning signal is generated by said player apparatus using digital signals generated by said player apparatus as a source.

10. A record storing first digital signals representative of an audio performance, and including second digital signals which, when reproduced as an audible signal, have a maximum amplitude substantially lower than that of said audio performance reproduced from said first digital signals, said second digital signals encoded on the record in such a position that they are reproduced as audible warning sounds during play of the record, prior to the reproduction of said audio performance.

11. The record of claim 10, including a plurality of audio performances stored on said record where said second digital warning signals are encoded on said record in such positions that each audio performance is preceded by said second digital signal.

12. The record of claim 11, wherein a time interval occurs between the reproduction of successive performances encoded on said record by a player apparatus and the digital signals are encoded on said record so as to generate warning signals during a portion of the time interval between successive performances so that during the balance of said time interval, no audio signal is generated by said player apparatus.

13. Player apparatus for generating audio signals under the control of a record storing an audio performance in digital form, said player apparatus including a switch operative to initiate play of the record to generate audio signals under the control of digital signals encoded on a record, said player apparatus further including means for generating an audio warning signal having a maximum amplitude lower than the maximum amplitude of the sounds reproduced from said record for a predetermined period of time following actuation of said play switch and before generating sounds based on digital signals encoded on said record.

14. The player apparatus of claim 13 including a read-only memory storing digital signals representative of the warning signal and means for causing read-out of said digital signals stored in said read-only memory upon actuation of said switch.

15. The player apparatus of claim 14 including a digital signal generator adapted to generate signals to cause said reproducing player to generate said warning sound.

16. The digital sound player apparatus of claim 13, including time delay means initiated upon closure of said switch and control means, operating under control of said time delay means to reproduce a warning signal for the period of the time delay and then to reproduce signals encoded on the record.

17. The player apparatus of claim 13 including user actuated means for disabling said audio warning signal so that when actuated no audio warning signal is generated following the actuation of said play switch.

* * * * *